2,775,607

REACTIVATION OF CATALYSTS

Herbert Kölbel and Paul Ackermann, Moers, Germany, assignors to Rheinpreussen Aktiengesellschaft für Bergbau und Chemie, Homberg (Lower Rhine), Germany, a German corporation No Drawing. Application November 12, 1953, Serial No. 391,722

Claims priority, application Germany November 17, 1952

3 Claims. (Cl. 260—449.6)

This invention relates to improvements in the reactivation of catalysts.

The process for the catalytic hydrogenation of carbon monoxide with the use of the synthesis catalyst in the form of a suspension is known. In this process the catalyst, such as a catalyst containing a metal of the eighth group of the periodic system, as, for example, iron, is suspended in an inert liquid, such as a hydrocarbon, and the synthesis gas, such as a carbon monoxide hydrogen-containing gas, is passed upward through the liquid suspension.

It is well known that the activity of these catalyst suspensions may suddenly drop after a certain period of operation. This sudden fall of catalyst activity is generally preceded by a slow decline of the activity which is common to all catalysts. The sudden fall of catalyst activity will be referred to hereinafter as the point of incipient catalyst activity decrease and is easily recognized by the artisan. Whereas the normal decline of the activity can be compensated for by gradually raising the reaction temperature or by other means, the sudden fall of the activity cannot be easily remedied. The common methods for reactivating catalysts, for example, by oxidation, hydrogenation, or extraction, have little effect on these inactive catalyst suspensions. Methods which result in a substantial change of the physical or chemical condition of the catalyst are more effective, but they entail considerable expenses, so that they become uneconomical in the case of catalysts made from cheap raw materials, such as iron catalysts.

It is one object of the present invention to provide a process for reactivating catalyst suspensions used in the liquid phase carbon monoxide hydrogenation. Another object is to provide a reactivation process for catalyst suspensions which can easily be carried out. A further object is to provide a method for the hydrogenation of carbon monoxide in a catalyst suspension which can be effected with good results over long periods of operation. Still further objects will become apparent from the following description:

These objects are attained in accordance with the present invention by diluting the catalyst suspension in which the carbon monoxide hydrogenation is carried out. The dilution in accordance with the invention may be carried out either during the operation, or at intervals between operations, but preferably it is effected after the point of incipient catalyst activity decrease during operation.

This finding is most surprising, since it was to be expected that the efficiency of the catalyst suspension would be parallel to the catalyst concentration. In other words, it was to be expected that the efficiency of the catalyst suspension would drop still further when the concentration of the catalyst is lowered. For this reason it was heretofore the general practice to maintain the catalyst concentration in the suspension at a constant level.

An emodiment of the invention comprises filling part of the reactor with a catalyst suspension of the usual concentration and diluting this suspension during the reaction, either by adding fresh suspending agent, or by letting liquid reaction products accumulate in the reactor. This mode of operation makes it possible to maintain a constant gas velocity, based on the final volume of the catalyst suspension, over the whole period of operation. A further advantage of this embodiment of the invention is that operation need not be discontinued by removing part of the catalyst.

Another mode of operation is to keep the volume of the catalyst suspension constant by removing from time to time a portion of the suspension and replacing it with an equal amount of a liquid medium. The latter may be added in the form of fresh suspending agent. Alternatively, the reaction may be conducted in such a way that liquid hydrogenation products accumulate in the reactor, thereby making up the decrease in the volume of the suspension.

The portion of the catalyst suspension which has been removed from the reactor is very frequently still sufficiently active to be useful at another stage of the carbon monoxide hydrogenation.

The process of the invention makes it possible to considerably enhance the over-all performance of the catalyst. The gas through-put may be maintained substantially constant in spite of the dilution and actual decrease in the amount of catalyst. Thus, substantially the same amount of synthesis products may be obtained with the reduced amount of catalyst, as was obtained initially with the larger quantity of catalyst. This is due to the fact that the dilution in accordance with the invention activates the catalyst. The gas load which may be handled by the catalyst can therefore be increased in proportion to the dilution. For example, if 50% of the suspension is withdrawn and replaced with fresh suspending agent, the gas load of the remaining catalyst may be increased 100%.

A further advantage of the invention resides in the fact that the formation of methane and ethane, which usually rises in proportion to the increasing inactivation of the catalyst during the operation, is maintained at a low level. Thus, the invention brings about an improvement in the composition of the reaction product. If the concentration of the catalyst is lowered suddenly after longer periods of time, the formation of methane and ethane, as a result, also decreases suddenly.

The extent to which the concentration of the catalyst in the suspension is lowered according to the invention depends upon the initial concentration and the mode of operation. Concentrated catalyst suspension must be diluted to a larger extent than suspension intially containing a small amount of catalyst. Catalysts containing supporting materials are diluted to a lesser extent than catalysts without the same. In general, the dilution in accordance with the invention is varied within the range of from about 70–5%, based on the initial concentration.

The process of the invention can be combined with known methods for the activation of catalysts, such as oxidation, hydrogentation, and extraction.

It has been found that part of the detrimental carbon formed in some reactions and acting as a thickening agent on the suspension, can be removed by decanting or centrifuging the suspension. Thereby a separation of the catalyst in portions comparatively rich in carbon and portions comparatively poor in carbon is accomplished. To the same end a magnetic field can be used, as has furthermore been found. The catalyst portions poor in carbon are then passed back to the reactor after having been suspended in a suitable liquid medium.

It is generally advisable to maintain the carbon content of the suspension below a level of about 6% by weight, based on the weight of the suspension.

The hydrogenation of carbon monoxide using catalyst suspensions which can be reactivated in accordance with the present invention is effected under the conventional reaction conditions. Thus, carbon monoxide and hydrogen are passed into the catalyst suspension in a ratio of from 2:1 to 1:2. The reaction is generally conducted under pressures from about 3 to about 150 atmospheres, and at temperatures ranging from about 150 to about 350° C. Among the catalysts which are suitable for the reaction are metals of the 8th group of the periodic table, as well as compounds and mixtures of these metals. The catalysts are suspended in aliphatic, aromatic and hydroaromatic hydrocarbons or their mixtures, which, under the synthesis conditions, are liquid and have only a small vapor pressure.

The invention is not restricted to the reactivation of catalyst suspensions used in the hydrogenation of carbon monoxide but can also be applied to other catalyst suspensions.

The details of the present invention will become apparent to those skilled in the art from a consideration of the following typical example of a specific embodiment thereof.

*Example*

6,000 kg. of a suspension of a catalyst containing 750 kg. of iron, 1 kg. of Cu, 0.5 kg. of Ni, 0.6 k. of Mn and 4 kg. of $K_2CO_3$ and no supporting material in a mixture of synthesis hydrocarbons boiling above 300° C. at normal pressure, are contacted in a pressure-proof and interiorly cooled synthesis reactor with a synthesis feed gas, containing carbon monoxide and hydrogen in the volume proportion of 1.5 CO to 1.0 $H_2$ under a pressure of about 12 atmospheres and at temperatures between 255 and 270° C. for several hundred hours. The gas load amounts to 1.5 normal cubic meters of CO+$H_2$ per 1 kg. of iron per hour. The conversion of carbon monoxide and hydrogen initially amounts to 88% and stays at this level for about 400 hours. From this time on the conversion drops to about 40% within a few days. By raising the reaction temperature or by changing the gas load, the conversion cannot be improved. Now about one-half of the suspension is withdrawn from the reactor and replaced with fresh or used hydrocarbons as used above for the preparation of the catalyst suspension. As a result, the conversion of carbon monoxide and hydrogen rises to 90% under otherwise equal reaction conditions. This means that the catalyst still present in the reactor and containing about 370 kg. of iron, now handles 3 normal cubic meters of CO+$H_2$ per 1 kg. of iron per hour. After another 600 hours, the catalyst suspension contained in the reactor is removed and in its place the catalyst suspension which had at first been removed is filled in after dilution with hydrocarbons until an iron content of about 6% is reached. Now the reaction is continued for another 600 hours.

During the whole operation (1,600 hours) per 1 kg. of the catalyst about 2,300 normal cubic meters of CO and $H_2$ are converted, the conversion being 88% thus forming 380 kg. of hydrocarbons containing 3 and more carbon atoms in the molecule, oxygenous organic products, and 28 kg. of methane, ethane, and ethylene.

We claim:

1. In the catalytic hydrogenation of carbon monoxide wherein the catalysis is effected by bringing a mixture of hydrogen and carbon monoxide in contact with a finely-divided solid catalyst suspended in a liquid reaction medium in a reaction zone, the reaction taking place in the presence of said suspended catalyst and wherein the activity of said catalyst in suspension declines slowly and then reaches a point of incipient catalyst activity decrease defined by a sudden fall of catalyst activity, the improvement making it possible to employ the catalyst after activity declines, which comprises removing part of said catalyst suspension from the reaction zone, dividing the catalyst of the removed suspension into a portion rich in carbon and a portion poor in carbon, suspending the latter portion in an inert liquid to thereby form a reactivated catalyst suspension, and thereafter passing this reactivated suspension to the aforesaid reaction zone.

2. A process in accordance with claim 1 wherein the removed catalyst suspension is divided as aforesaid into a portion rich in carbon and a portion poor in carbon by centrifuging said suspension.

3. A process in accordance with claim 1 wherein the removed catalyst is divided as aforesaid into a portion rich in carbon and a portion poor in carbon by subjecting said suspension to the action of a magnetic field.

References Cited in the file of this patent

UNITED STATES PATENTS

| | | |
|---|---|---|
| 2,257,293 | Dreyfus | Sept. 30, 1941 |
| 2,396,109 | Martin | Mar. 5, 1946 |
| 2,479,435 | Vesterdal | Aug. 16, 1949 |
| 2,530,243 | Holder | Nov. 14, 1950 |